United States Patent Office 2,967,859
Patented Jan. 10, 1961

2,967,859
PROCESS FOR DIGLUCOSE UREIDE

Lloyd I. Osipow, Monsey, and William C. York, deceased, late of Westbury, N.Y., by Ruth M. York, administratrix, Mineola, N.Y., assignors to W. R. Grace & Co., New York, N.Y., a corporation of Connecticut No Drawing. Filed May 22, 1959, Ser. No. 814,996

12 Claims. (Cl. 260—211)

This invention relates to a new process for the preparation of diglucose ureide.

Diglucose ureide has been previously prepared by the action of benzoyl chloride in pyridine on glucose ureide followed by cleavage of the octabenzoyl derivative with ammonia in methanol, Helferich and Kosche, Ber., 59, 69 (1926). Glucose ureide, that is monoglucose ureide, can be prepared by the reaction of equimolecular quantities of glucose and urea, Meijer, U.S. Patent 2,612,497. Diglucose ureide has also been prepared by the action of silver cyanate on tetraacetyl-1-bromoglucose, hydrolysis of the resultant glucose isocyanate to the urea and finally cleavage of the acetate esters with ammonium hydroxide, Johnson and Bergmann, J. Am. Chem. Soc., 54, 3362 (1932). Interest in diglucose ureide as a chemical of commerce has increased with the discovery that it may be useful as a supplement in feed for cattle, Paquin, Zeitschrift für Tierzucht Züchtungbiol., 58, 365 (1950), and a starting material for the preparation of long chain diglucose ureide esters suitable as components of detergent formulations, our co-pending application S.N. 663,579, filed June 5, 1957. Neither of the two series of reactions discussed above is suitable for the commercial preparation of diglucose ureide. We have discovered that diglucose ureide can be made more conveniently and at lower cost from inexpensive commercially available raw materials by the reaction of two moles of glucose with one mole of urea than by the aforementioned routes.

It is, therefore, an object of the present invention to provide a new method for the preparation of diglucose ureide which may be suitable for the commercial manufacture of the compound.

We have discovered that the reaction of at least two moles of glucose with one mole of urea in the presence of water and a strong acid at temperatures between 75°C. and the boiling point of the reaction mixture gives diglucose ureide as the major product according to the equation

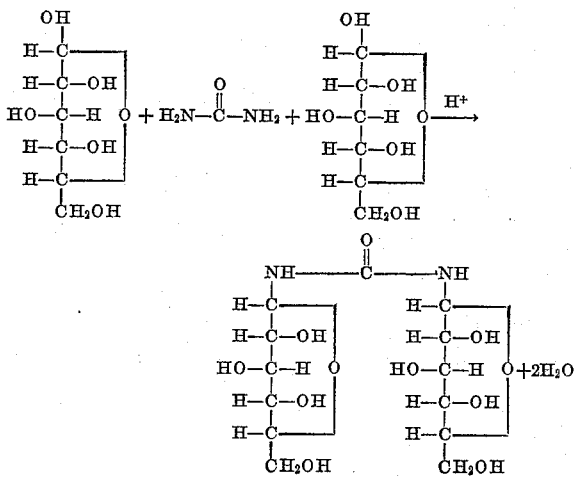

We have found that the success of our synthesis depends on the amount of water present. The formation of diglucose ureide will not occur when the dry reactants are heated together or when less than 0.20 mole of water per mole of glucose used is present initially. Heating in water-free organic solvents, such as the glycols, results in internal dehydration and ether formation yielding undesirable oligosaccharides. Although there is no theoretical limitation as to the amount of water in excess that may be present, the rate of reaction and the yield of product isolated fall off as increasingly larger amounts of water are used. We have discovered that optimum yields are obtained in the shortest time when about 0.5 to 1.0 mole of water is present per mole of glucose to be reacted.

Normally, two moles of glucose per mole of urea are used as called for by the stoichiometry of the reaction. Excess glucose may be used but we have found no advantage in so doing. The time of reaction depends on the concentrations of the reactants with respect to the solvent and the temperature to which the reaction mixture is heated. The reaction rate is too slow to be practical below 75°C. and the preferred temperature range has been found to be from 80°C. to the boiling point of the reaction mixture.

When the optimum amount of water is used, the reaction mixture becomes extremely viscous after a time and efficient stirring becomes very difficult, resulting in degradation due to localized overheating. We have discovered that carrying out the process in the presence of an unreactive solvent helps alleviate this difficulty by increasing the dispersibility of the solids present; the use of water-miscible solvents such as the lower alcohols is particularly helpful in this regard. The use of an unreactive water-immiscible solvent such as heptane changes the nature of the reaction mixture allowing us to continue stirring for longer periods of time. In either situation, miscible or immiscible, by unreactive solvent we mean unreactive under the conditions of our process. We have also discovered that a product greatly improved in color and purity is obtained when we bubble gaseous sulfur dioxide continuously through the reaction mixture; this result is not obtained using nitrogen.

Our reaction does not proceed at an appreciable rate in the absence of a strong acid catalyst. By strong acid we mean proton yielding acids at least comparable in strength to formic acid. Suitable acids include sulfuric acid, phosphoric acid, polyphosphoric acid, hydrochloric acid, formic acid, alkane and aryl sulfonic acids, etc. Only small concentrations of the acid are required and too high a concentration will cause degradation of the carbohydrate material. While these limits are not critical, best results are obtained using about 1 to 5% of an acid such as sulfuric acid.

Isolation of diglucose ureide from the reaction mixture is accomplished by the standard methods well known to those versed in the art of organic chemistry. Often the reaction mixture is first neutralized with dilute base. Sometimes the product crystallizes directly from the reaction mixture on cooling; the addition of a diluent like alcohol may be used to promote crystallization and to decrease the solubility of the product in the reaction mixture. The crude product is best purified by recrystallization from aqueous methyl alcohol.

The scope and utility of our invention is further illustrated by the following examples:

Example I

Five moles (900 g.) of glucose was added in small portions to 100 g. of 50% aqueous isopropyl alcohol mechanically stirred and kept at 70–80° C. After the addition had been completed and a homogeneous dispersion obtained (about one hour), 2.5 moles (150 g.) of urea was added and agitation continued until a viscous homogeneous syrup was obtained. Twenty ml. of 50% aqueous sulfuric acid was added and the reaction mixture stirred at 80–90° C. for one hour. Additional isopropyl alcohol was added and heating continued for another 30 minutes when stirring became extremely difficult because of the high viscosity of the reaction mixture. At that point, 250 ml. of 1 N aqueous sodium hydroxide was added and heating continued until the entire reaction mass dissolved. After standing at 5–10° C. for 60 hours, the thick reaction mixture was diluted to two liters with methyl alcohol and filtered. The precipitate was dissolved in 350 ml. of boiling water and decolorized with charcoal. The filtrate, recovered after removal of the charcoal, was diluted to two liters with methyl alcohol to precipitate the product. This was recovered by filtration and washed with methyl alcohol and acetone to give 391 g. (40.8% yield) of a light brown solid decomposing at 220–230° C. Subsequent recrystallization from aqueous methyl alcohol gave essentially pure diglucose ureide which decomposed at 260–270° C. and had a specific rotation of $[\alpha]_D^{25} = -32.7°$ C. From its physical properties, our product appears to possess a higher degree of purity than the diglucose ureide reported in the references cited above.

*Example II*

Fifty grams (0.83 mole) of urea and 300 g. (1.66 moles) of glucose were dispersed in 35 ml. of 50% aqueous isopropyl alcohol and 3.5 ml. of methanesulfonic acid added. After the mixture had been stirred for one hour at 85–90° C., 25 ml. of isopropyl alcohol was added and heating continued for 30 minutes. The reaction mixture was neutralized with 60 ml. of 1 N sodium hydroxide and the resultant solution refrigerated for two days. Addition of 500 ml. of 85% aqueous methyl alcohol caused precipitation of the product which was collected by filtration, washed with methyl alcohol and acetone and dried in vacuo. The crude yield of diglucose ureide was 95 g.; pure product was obtained by recrystallization from aqueous methyl alcohol.

*Example III*

In another experiment, 50 g. of urea and 300 g. of glucose (same number of moles as in the previous example) were dispersed in 20 ml. of 50% isopropyl alcohol and 3.5 ml. of polyphosphoric acid added. The reaction mixture was stirred for 1.5 hours at reflux temperature and then neutralized with 50 ml. of 1 N sodium hydroxide. The dark solution was diluted with 390 ml. of 90% aqueous methanol and kept refrigerated for 4 days. The solid material which separated out was recovered by filtration, washed with aqueous methanol, methanol and acetone. The yield of crude diglucose ureide was 116 g.

*Example IV*

In a small scale preparation, 1.5 g. (0.025 moles) of urea was dissolved in 1.0 ml. of 50% aqueous isopropyl alcohol and 9 g. (0.05 moles) of glucose was added with stirring. When a homogeneous dispersion was obtained, 0.05 ml. of concentrated sulfuric acid was added and the mixture heated at reflux for 60 minutes. After neutralization with 1.5 ml. of 1 N sodium hydroxide and dilution with 20 ml. of 90% aqueous methyl alcohol, the reaction mixture was refrigerated for an extended period of time. The solid obtained on filtration was found to be 1.4 g. of diglucose ureide.

*Example V*

This example shows the failure of the preparative reaction when insufficient water is present. A solution of 0.6 ml. of 85% phosphoric acid in 3.5 ml. of water was added dropwise to an intimate mixture of 240 g. (1.33 moles) of glucose and 40 g. (0.66 moles) of urea. The mixed solids were then ball-milled with steel balls for 48 hours. The resulting hard mass was crushed in a mortar and passed through a No. 45 sieve. A flask containing 26 g. of this sifted material was heated to melting in an oil bath and the temperature maintained at 125° C. for 25 minutes. Using a work-up similar to that reported in the previous examples, no diglucose ureide could be isolated. Pyrolysis of monoglucose ureide also failed to yield any diglucose ureide.

*Example VI*

All attempted preparations of diglucose ureide by the heating of glucose and urea (2:1 molar ration) in non-aqueous or anhydrous solvents and in the absence of a strong acid failed. In most cases extensive decomposition occurred.

*Example VII*

This experiment shows the beneficial results obtained when our process is effected in the presence of sulfur dioxide. In a procedure comparable to that of Example IV, 50 g. of urea and 300 g. of glucose were dispersed in 35 ml. of 50% isopropyl alcohol and 3.0 ml. of polyphosphoric acid added. A fine stream of sulfur dioxide gas was slowly bubbled through the reaction mixture. After heating for two hours, the reaction mixture was neutralized by the addition of 35 ml. of 1 N sodium hydroxide, 50 ml. of water and 100 ml. of 80% aqueous methyl alcohol. The first crop of crystals collected was lighter in color and purer (by optical rotation) than the corresponding crop in Example III and only one recrystallization from aqueous methanol was required to obtain substantially pure diglucose ureide.

We claim:

1. A process for the preparation of diglucose ureide which comprises heating at least two moles of glucose with one mole of urea from about 75° C. to the boiling point of the reaction mixture in the presence of about 0.2 to 1 mole of water for each mole of glucose and a strong acid catalyst, and recovering the diglucose ureide thus formed from the reaction mixture.

2. A process for the preparation of diglucose ureide which comprises heating two moles of glucose with one mole of urea from about 75° C. to the boiling point of the reaction mixture in the presence of about 0.2 to 1 mole of water for each mole of glucose and a strong acid catalyst, and recovering the diglucose ureide thus formed from the reaction mixture.

3. A process according to claim 2 wherein the catalyst is sulfuric acid.

4. A process for the preparation of diglucose ureide which comprises heating two moles of glucose with one mole of urea from about 75° C. to the boiling point of the reaction mixture in the presence of about 0.2 to 1 mole of water for each mole of glucose, an inert solvent and a strong acid catalyst; and recovering the diglucose ureide thus formed from the reaction mixture.

5. A process according to claim 4 wherein the solvent is miscible with water.

6. A process according to claim 4 wherein the catalyst is sulfuric acid.

7. A process for the preparation of diglucose ureide which comprises heating two moles of glucose with one mole of urea from about 75° C. to the boiling point of the reaction mixture in the presence of at least 0.20 mole of water, a strong acid catalyst and sulfur dioxide; and recovering the diglucose ureide thus formed from the reaction mixture.

8. A process according to claim 7 wherein the catalyst is polyphosphoric acid.

9. A process for the preparation of diglucose ureide which comprises heating at least 2 moles of glucose with 1 mole of urea at a temperature from about 75° C. to the boiling point of the reaction mixture in the presence of about 0.2 to 1 mole of water for each mole of glucose and a strong acid catalyst, adding a basic material to neutralize the acid, cooling the reaction mixture to a temperature below about 15° C., recovering the crude product and purifying said crude product by recrystallization from a methanol solution.

10. A process for the preparation of diglucose ureide which comprises heating 2 moles of glucose with 1 mole of water at a temperature from about 75° C. to the boiling point of the reaction mixture in the presence of about 0.2 to 1 mole of water for each mole of glucose, an inert solvent and a strong acid catalyst, cooling the reaction mixture to a temperature below about 15° C., recovering the crude product and purifying said product by recrystallization from a methanol solution.

11. A process for the preparation of diglucose ureide which comprises heating 2 moles of glucose with 1 mole of urea at a temperature from about 70° C. to the boiling point of the reaction mixture in the presence of about 0.2 to 1 mole of water for each mole of glucose, a strong acid catalyst and sulfur dioxide, recovering the crude product and purifying said crude product by recrystallization from a methanol solution.

12. A process for the preparation of diglucose ureide which comprises heating 2 moles of glucose with 1 mole of urea at a temperature from about 75° C. to the boiling point of the reaction mixture in the presence of about 0.20 to 1 mole of water for each mole of glucose, catalytic amounts of polyphosphoric acid and sulfur dioxide, recovering the crude product and purifying said product by recrystallization from a methanol solution.

References Cited in the file of this patent

Schoorl., Rec. Trav. Chim., 22, 31–35 (1903).